Feb. 26, 1924.
W. G. SAMPSON ET AL
1,484,966
CLEVIS
Filed July 14, 1921
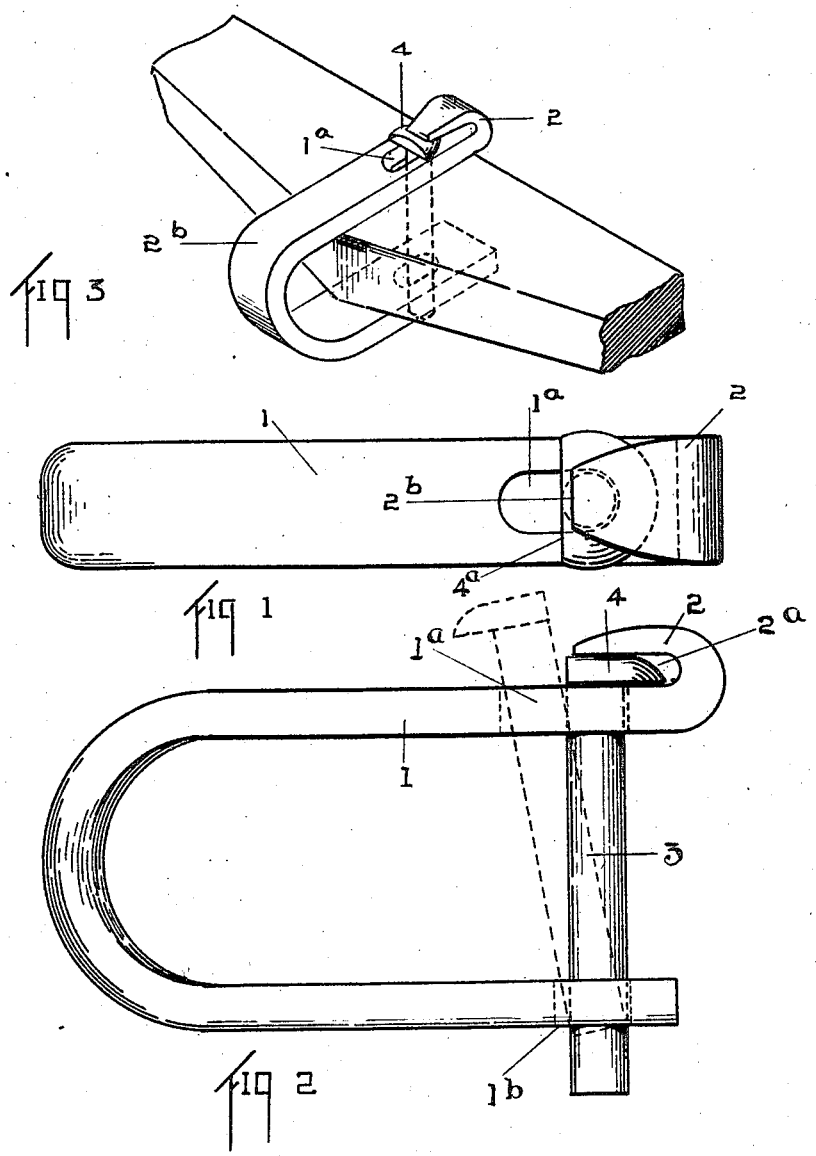
INVENTORS
WILLIS G. SAMPSON
BY & OTIS SAMPSON
A.B.Bowman
ATTORNEY Patented Feb. 26, 1924.

1,484,966

UNITED STATES PATENT OFFICE.

WILLIS G. SAMPSON AND OTIS SAMPSON, OF HANSEN, IDAHO.

CLEVIS.

Application filed July 14, 1921. Serial No. 484,745.

*To all whom it may concern:*

Be it known that we, WILLIS G. SAMPSON and OTIS SAMPSON, citizens of the United States, residing at Hansen, in the county of Twin Falls and State of Idaho, have invented a certain new and useful Clevis, of which the following is a specification.

Our invention relates to a clevis, more particularly adapted for connecting a double-tree or the like to an object to be drawn used for draft purposes and the objects of our invention are; first, to provide a clevis which may be very quickly connected to or disconnected from the double tree; second, to provide such a clevis which when connected to the double-tree will not become disconnected therefrom, particularly when the draft is applied; third, to provide a clevis of this class in which the pin must be in a certain position to be inserted or removed and fourth, to provide a clevis of this class which is very simple and economical of construction, durable, easy to manually install and release usually termed "hitch" and "unhitch" and which will not readily deteriorate or get out of order.

With these and other objects in view as will appear hereinafter our invention consists of certain novel features of construction, combination and arrangement of parts and portions as will be hereinafter described in detail and particularly set forth in the appended claim, reference being had to the accompanying drawings and to the characters of reference thereon which form a part of this application in which:

Figure 1 is a top or plan view of our clevis with the pin in its position when ready for use. Fig. 2 is a side elevational view of the clevis with the pin in its position when ready for use and showing by dotted lines the position of the pin when partially removed and Fig. 3 is a perspective view of the clevis in its operative position on a fragmentary portion of a double-tree.

Similar characters of reference refer to similar parts and portions throughout the several views of the drawings.

The U-shaped clevis member 1, turned back portion 2, pin 3 and pin head portion 4 constitute the principal parts and portions of our clevis. The U-shaped clevis member is of the conventional type of U-shaped member with a hole in each end except that the hole 1ª in the normally upper side is an oblong hole while the hole 1ᵇ in the normally lower side is preferably round. The normally back side of the hole 1ª is considerably back of alinement with the back side of the hole 1ᵇ as shown best in Fig. 2 of the drawings. The normally upper portion of the member 1 is provided with an extended backwardly turned portion 2 which extends backwardly to approximately the middle of the hole 1ª leaving a space 2ª between this turned back portion and the main portion with which it is integrally connected. This space 2ª is of the proper width to readily admit the head 4 of the pin 3 as shown by solid lines in the drawings. The pin 3 is of the ordinary or conventional type straight round pin and it is provided with a head 4 on the normally upper end which head 4 is extended providing a flanged head on the pin 3. This head 4, however, is only provided with a circular flange around a portion of the pin 3 while one side is flat approximately in alinement with the side of the pin leaving a flat side 4ª and the portion 2 is also provided with a straight flat portion 2ᵇ extending transversely across the hole 1ª.

When inserting or removing the pin the clevis is thrust forwardly on the doubletree, or the double tree pressed backwardly in the clevis and the pin inserted with the flat side of the pin head 4ª toward the flat side 2ª of the portion 2 as shown best by dotted lines in Figs. 2 of the drawings, then the pin is turned when it reaches the proper position and the extended portion of the head extends into the space 2ª and when released assumes the position as shown by solid lines in Figs. 1, 2, and 3 of the drawings. It will be noted that at practically all times the head end of the pin adjacent to the head portion 4 rests against the normally front side of the hole 1ª and would not come out even if the flat portion 4ª was in alinement with the flat portion 2ᵇ of the portion 2 without moving the clevis relatively to the double-tree.

Though we have shown and described a particular construction, combination and arrangement of parts and portions, we do not wish to be limited to this particular construction, combination and arrangement but desire to include in the scope of our invention the construction, combination and arrangement substantially as set forth in the appended claim.

Having thus described our invention what we claim as new and desire to secure by Letters Patent is:

A clevis, including a U-shaped member provided with an oblong hole in the normally upper portion and with an extended turned back straight end portion extending backwardly over said oblong hole approximately one-half the length of said hole and provided with another relatively short hole in the normally lower portion of said U-shaped member, and a pin with a head on one end cut away on one side flush with the side of said pin, said pin being adapted to be inserted in said holes so that the flat side of the head passes the straight end of said extended turned back portion, the head resting between the extended end of said turned back portion and the normally upper portion of said U-shaped member when the pin is turned in said holes.

In testimony whereof, we have hereunto set our hands at Hansen, Idaho, this 8th day of July, 1921.

WILLIS G. SAMPSON.
OTIS SAMPSON.